Patented Oct. 20, 1953

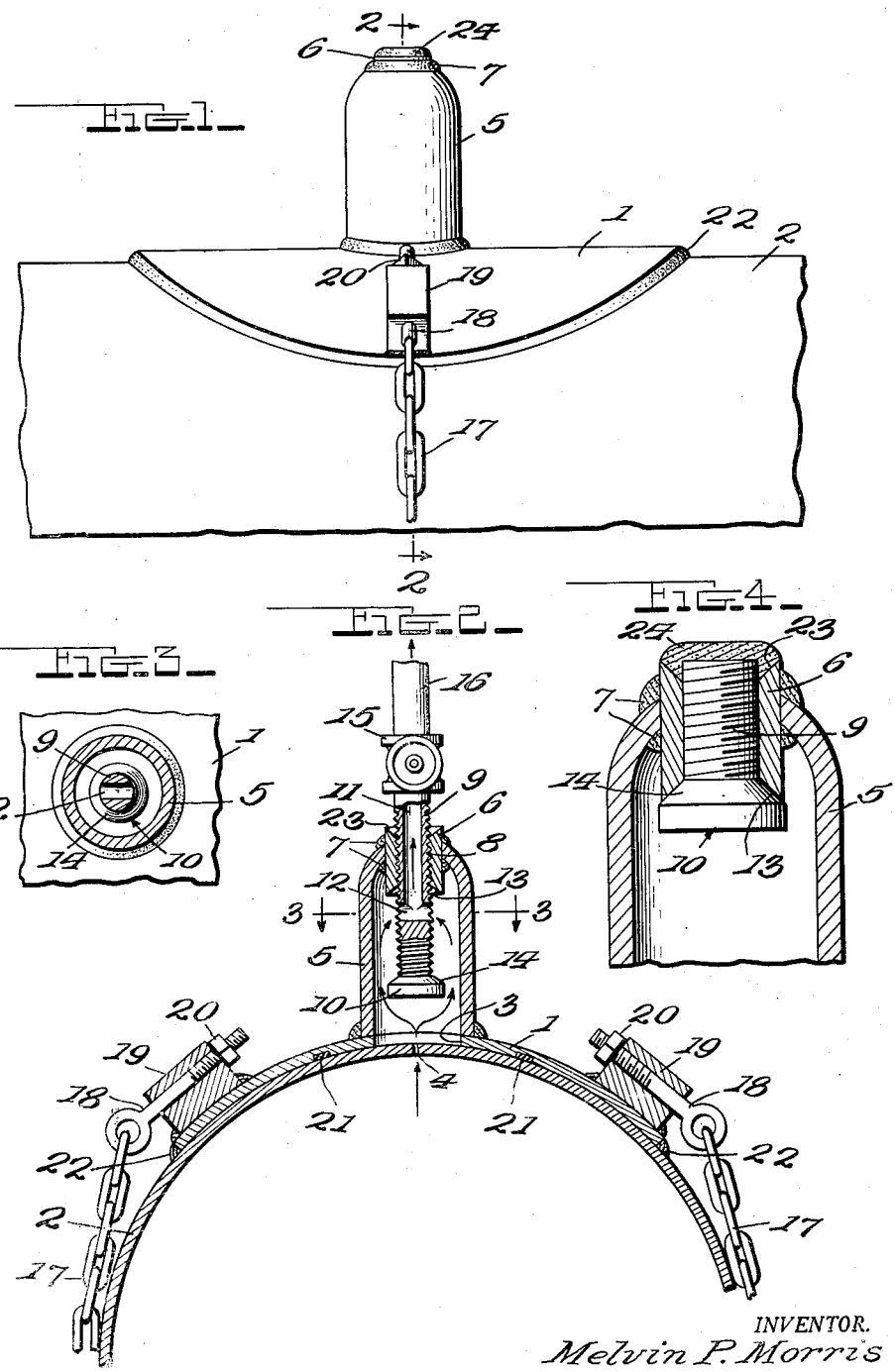

2,655,946

UNITED STATES PATENT OFFICE 2,655,946

VALVE FOR LEAK PATCHING DEVICE FOR PIPE LINES

Melvin P. Morris, Okmulgee, Okla.

Application June 2, 1949, Serial No. 96,786

3 Claims. (Cl. 138—99)

My invention consists in new and useful improvements in a leak patching device for repairing high pressure pipe lines, such as natural gas, crude oil, or gasoline pipe lines, and has for its object to provide a patch pad which may be applied and welded in place on a pipe line without interrupting the normal flow of pressure fluid and at the same time avoiding the danger of fire and explosion caused by the use of welding torches and similar equipment in the presence of escaping gas or vapor.

I am familiar with certain previous efforts along this general line which included a system of diverting the escaping gas or liquid to a point beyond the danger zone during the application of a patch pad to a pipe line. While these previous devices may have been satisfactory to a certain extent for use in connection with relatively low pressure pipe lines, they have not proven satisfactory in meeting the conditions prevailing in present day high pressure pipe lines. This has been primarily because of the design of the patch pad and the valve means for controlling the diversion and ultimate sealing off of the escaping gas.

It is therefore the primary object of my invention to provide a patch pad which may effectively be used in repairing leaks in pipe lines operating under a pressure of at least 800 lbs. per square inch. In furtherance of this end, I employ a patch pad adapted to fit over a leak in the pipe line and provided with a fluid diversion and controlling dome equipped with an improved internal valve structure which serves the dual purpose of facilitating the connection of the fluid diversion line and the ultimate sealing off of the dome after the patch has been welded in place.

With the above and other objects in view which will appear as the description proceeds, my invention consists in the novel features hereinafter set forth illustrated in the accompanying drawings and more particularly pointed out in the appended claims.

Referring to the drawings, in which numerals of like character designate similar parts throughout the several views:

Fig. 1 is a fragmentary view in side elevation showing my improved patch pad welded in place on the periphery of a pipe line;

Fig. 2 is a transverse sectional view taken on line 2—2 of Fig. 1, but before the removal of the diversion line and with the valve in open position;

Fig. 3 is a sectional view taken on line 3—3 of Fig. 2; and

Fig. 4 is an enlarged sectional detail showing the valve in closed position and with the upper end of the dome sealed.

In the drawings, 1 represents my improved patch pad which may be of any desired shape in plan but which is curved or otherwise formed transversely to conform to the contour of the pipe line 2 or other surface to which the pad is to be applied. The central portion of the pad 1 is provided with an opening 3 of a size to accommodate and encircle a leak 4 in the pipe line.

Immediately above the opening 3 and welded or otherwise permanently sealed at its lower edge to the pad around the boundary of the opening 3, I provide a fluid controlling dome 5, which is in communication with the leak 4 through the medium of the opening 3 in the pad. The upper end of the dome 5 is centrally apertured to receive a bushing or collar 6 which extends axially through the top wall of the dome and is welded both internally and externally as at 7. This bushing 6 is internally threaded to receive the complementary threads 8 of a valve stem 9, the latter terminating at its lower extremity in an enlarged valve head 10 lying within the dome 5.

The valve stem 9 is longitudinally drilled to form a diversion passageway 11 extending from a transverse port 12 in the valve stem, through the outer end of the stem 9. As will be seen from Fig. 2, the transverse port 12 is normally located at a point below the bushing 6 in open communication with the interior of the dome 5, whereby fluid entering the dome through the leak 4 is permitted to escape through the longitudinal passageway 11 in the valve stem 9. It will be understood that the valve stem 9 may be rotated from the exterior of the dome 5 to control the position of the valve head 10, with respect to the valve seat at the inner end of the bushing 6. This valve seat is preferably inwardly beveled and machined as at 13, to receive the complementary beveled and machined face 14 on the valve head 10 to insure a tight closing of the valve when in its extreme upper position. The outer extremity of the valve stem 9 is threaded to accommodate a suitable gate valve 15 in the diversion line 16 to control the flow of escaping fluid, as will be hereinafter described.

I have found that the most practical method of securing the patch pad 1 in place on the pipe line during the repair operation is by means of a chain 17 which encircles the pipe line and is connected at each end to an eye bolt 18. The eye bolts 18 are adapted to engage suitable openings in respective lugs 19 welded to the adjacent edges of the pad 1, as will be seen from Fig. 2. By tightening the nuts 20 on the eye bolts 18, the pad 1 is caused to firmly embrace the periphery of the pipe line around the leak area. In this connection, I have also found it advantageous to provide a circular rubber gasket or seal 21 in the under face of the pad 1 for encircling the area adjacent the leak 4.

Having thus described the construction of my improved patch pad, its use and operation are as follows: Upon ascertaining the location of a leak in a pipe line, a pad 1 of suitable contour and size is placed on the pipe line with the opening 3 over the leak 4, the chain 17 being placed around the pipe line and secured in place by the proper adjustment of the nuts 20 on the eye bolts 18. The stem 9 of the valve to which has been applied the gate valve 15, is backed out of the bushing 6 until the beveled face 14 of the valve head 10 firmly engages its seat in the bushing 6, thus temporarily stopping the flow of escaping fluid from the dome 5, with closure of the gate valve 15. The valve stem 9 may now be screwed into the dome until the transverse port 12 has descended to a point below the bushing 6, as shown in Fig. 2, the escape of fluid from the dome being prevented by the closed gate valve 15. A diversion line 16 is then connected to the gate valve and when the latter is opened, the escaping fluid is diverted to a point remote from the danger area.

The patch pad 1 may be welded in place on the pipe line 1, as shown at 22, by any suitable means and during this operation, it will be apparent that the escaping gas or vapor is continuously diverted through the dome and the diversion line 16, thus rendering the welding operation safe from explosion.

Upon completion of the welding operation, the gate valve 15 is closed, the connection to the diversion line 16 removed, and the valve stem 9 backed out through the bushing 6. When the valve stem has reached its extreme outward position, the valve 10 is firmly seated against seat 13, providing an additional seal against leakage as the gate valve 15 is removed. The valve stem 9 is then cut off at a point substantially in line with the upper end of the bushing 6, as shown in Fig. 4, and the end of the valve stem welded or otherwise permanently sealed around the bushing. To facilitate this latter operation, I preferably provide the upper end of the bushing 6 with an internally beveled edge 23 which provides a more effective seal when welded, as shown at 24. The securing chain 17 may now be removed and the patching operation is complete.

From the foregoing, it is believed that my invention may be readily understood by those skilled in the art without further description, it being borne in mind that numerous changes may be made in the details of construction and operation without departing from the spirit of the invention as set forth in the following claims.

I claim:

1. A valve and sealing assembly for a high pressure leak patching device; said assembly comprising a hollow, upstanding dome, the open base of which is adapted to be sealed to the outer face of a metallic pipe line patch pad, around a leak encircling opening in the latter, an internally threaded discharge throat in the end wall of said dome, bounded at its inner end by a valve seat lying within said dome, an elongated threaded plug filling said discharge throat, the inner end of said plug extending into said dome and being solid for a longitudinal distance at least equal to the length of said throat, said solid end terminating in a valve head adapted for engagement with said valve seat, a transverse port located in said plug at the outer terminus of said solid portion, a longitudinal passage way in said plug communicating at its inner end with the interior of said dome, through said port and extending to the opposite end of the plug, the latter end of said threaded plug projecting through said discharge throat to the exterior of said dome and being adapted for connection to a fluid diversion line, said plug being longitudinally adjustable in said discharge throat, whereby said valve head is seated and the solid portion of the plug fills said throat, upon the extreme outward movement of said plug to seal off the interior of said dome.

2. A valve and sealing assembly for a high pressure leak patching device; said assembly comprising a hollow, upstanding dome, the open base of which is adapted to be sealed to the outer face of a metallic pipe line patch pad, around a leak encircling opening in the latter, an aperture in the end wall of said dome, an internally threaded bushing sealed in said aperture and projecting through the wall of said dome, a valve seat formed in the inner end of said bushing, a valve stem threaded to engage said bushing and projecting internally and externally therethrough, a longitudinally extending vent passageway in said stem communicating with the interior of said dome through a transverse port in said stem, a valve head carried at the inner end of said stem for engagement with said seat upon the extreme outward movement of said stem, said stem being solid from said head, for a longitudinal distance at least equal to the length of said bushing, the outer end of said stem serving as a means for connecting said vent passageway with a fluid diversion line during the welding operation, said valve stem being adapted to be severed on a line determined by the outer extremity of said bushing when said valve is in its final closed position, and means at the outer end of said bushing to accommodate a weld around said severed stem.

3. A valve and sealing assembly as claimed in claim 1, wherein that portion of the plug beyond the solid portion is adapted to be severed when the plug is in its extreme outward position, and means at the outer end of said throat, adjacent the severed end of the plug, to accommodate a weld.

MELVIN P. MORRIS.

References Cited in the file of this patent

UNITED STATES PATENTS

| Number | Name | Date |
| --- | --- | --- |
| 179,050 | Perkins | June 20, 1876 |
| 261,914 | Eberhard | Aug. 1, 1882 |
| 291,603 | Kincaid | Jan. 8, 1884 |
| 1,737,181 | Woodward | Nov. 26, 1929 |
| 2,002,577 | Ice | May 28, 1935 |
| 2,046,766 | Bronsell | July 7, 1936 |
| 2,492,507 | Tipton | Dec. 27, 1949 |